(12) United States Patent
Nezu

(10) Patent No.: US 11,090,673 B2
(45) Date of Patent: Aug. 17, 2021

(54) FLUID DISCHARGE MECHANISM AND SPRAY DEVICE FOR FLUID

(71) Applicant: NIFCO INC., Yokosuka (JP)

(72) Inventor: Mikio Nezu, Yokosuka (JP)

(73) Assignee: NIFCO INC., Yokosuka (JP)

(*) Notice: Subject to any disclaimer, the term of this patent is extended or adjusted under 35 U.S.C. 154(b) by 30 days.

(21) Appl. No.: 16/650,971

(22) PCT Filed: Sep. 21, 2018

(86) PCT No.: PCT/JP2018/035072
§ 371 (c)(1),
(2) Date: Mar. 26, 2020

(87) PCT Pub. No.: WO2019/073785
PCT Pub. Date: Apr. 18, 2019

(65) Prior Publication Data
US 2020/0290075 A1    Sep. 17, 2020

(30) Foreign Application Priority Data

Oct. 11, 2017   (JP) .............................. JP2017-197755

(51) Int. Cl.
*B05B 12/08*    (2006.01)
*B08B 3/02*    (2006.01)
(Continued)

(52) U.S. Cl.
CPC .............. *B05B 12/087* (2013.01); *B08B 3/02* (2013.01); *B60S 1/56* (2013.01); *B60S 1/46* (2013.01)

(58) Field of Classification Search
CPC ........ F16K 17/02; F16K 31/084; F04B 39/10; F04B 39/123; F04B 39/08; B05B 1/3006;
(Continued)

(56) References Cited

U.S. PATENT DOCUMENTS 6,021,813 A * 2/2000 Imhof ................. F15B 13/0402
137/625.65
2005/0051216 A1   3/2005 Sato
(Continued)

FOREIGN PATENT DOCUMENTS

JP    S46-019202 B1    5/1971
JP    2005-083395 A    3/2005
(Continued)

OTHER PUBLICATIONS

PCT/ISA/210, "International Search Report for International Application No. PCT/JP2018/035072," dated Dec. 25, 2018.

*Primary Examiner* — Benjamin L Osterhout
(74) *Attorney, Agent, or Firm* — Manabu Kanesaka

(57) ABSTRACT

A fluid discharge mechanism includes a valve chamber having a linking portion linked to a pressurization space for a fluid, a first communication portion formed on a side opposite to the linking portion, and a second communication portion formed at a location between the linking portion and the first communication portion; a main flow channel communicating the second communication portion with a discharge opening; a sub-flow channel communicating the first communication portion with the main flow channel; and a valve member located inside the valve chamber and formed so as to move forward to the first-communication-portion side when the pressurization-space side reaches a predetermined pressure, to open the second communication portion, thereby performing the discharge, and so as to move backward to the communication-portion side after completion of the discharge.

4 Claims, 6 Drawing Sheets

(51) Int. Cl.
*B60S 1/56* (2006.01)
*B60S 1/46* (2006.01)

(58) Field of Classification Search
CPC ....... B05B 1/083; B05B 12/087; B05B 1/005; B05B 1/3053; B60S 1/56; B60S 1/46; B08B 3/02
See application file for complete search history.

(56) References Cited

U.S. PATENT DOCUMENTS

| | | |
|---|---|---|
| 2015/0343999 A1* | 12/2015 | Lopez Galera ......... B60S 1/481 |
| | | 134/30 |
| 2016/0339875 A1* | 11/2016 | Ina .......................... B60S 1/522 |
| 2017/0021810 A1* | 1/2017 | Trebouet ................... B08B 5/02 |
| 2017/0182980 A1* | 6/2017 | Davies ...................... B60S 1/54 |
| 2017/0210304 A1* | 7/2017 | Davies ................... H04N 7/183 |
| 2018/0126406 A1* | 5/2018 | Galera ...................... B05B 7/26 |

FOREIGN PATENT DOCUMENTS

| | | |
|---|---|---|
| JP | 2010-185469 A | 8/2010 |
| JP | 2017-528358 A | 9/2017 |
| JP | 2018-118717 A | 8/2018 |

\* cited by examiner

FLUID DISCHARGE MECHANISM AND SPRAY DEVICE FOR FLUID

FIELD OF TECHNOLOGY

The present invention relates to a fluid discharge mechanism, and a spray device for a fluid comprising the fluid discharge mechanism.

BACKGROUND ART

As a control valve wherein a valve member comprises a permanent magnet which is attracted to a valve sheet inside a valve body, and when a pressure of air on an inflow hole side exceeds a magnetic attraction force, a valve member is moved to an open position so as to send air from an exhaust port to an outside, there is the control valve shown in Patent Document 1.

In the control valve of the Patent Document 1, air existing in a space on a destination side of the valve member located in a closed position is discharged to the outside through a small hole so as not to hinder a movement of the valve member.

PRIOR ART DOCUMENT

Patent Document

Patent Document 1: Japanese Unexamined Patent Application Publication No. 2010-185469

SUMMARY OF THE INVENTION

Problems to be Solved by the Invention

A main object of the present invention is to reasonably improve this type of fluid discharge mechanism (the control valve), and a function of the spray device for the fluid formed by including the fluid discharge mechanism.

Means for Solving the Problems

In order to obtain the aforementioned object, in the present invention, in a first aspect of the present invention, a fluid discharge mechanism for intermittently discharging a fluid from a discharge opening, comprises a valve chamber including a linking portion linked to a pressurization space for the fluid, a first communication portion formed on a side opposite to the linking portion, and a second communication portion formed at a location between the linking portion and the first communication portion; a main flow channel communicating the second communication portion and the discharge opening; a sub-flow channel communicating the first communication portion and the main flow channel; and a valve member located inside the valve chamber and formed so as to move forward to a first-communication-portion side when a pressurization-space side reaches a predetermined pressure, to open the second communication portion, thereby performing the discharge, and so as to move backward to a linking-portion side after completion of the discharge.

According to the aforementioned structure, a space on a forward-movement-end side of the valve member communicates with the main flow channel through the sub-flow channel, so that in a forward movement of the valve member, i.e. a movement from a valve closing position to a valve opening position, the fluid located in the space on the forward-movement-end side of the valve member can be sent to a main-flow-channel side, and such a forward movement of the valve member can be smoothly carried out. Especially, the fluid located in the space on the forward-movement-end side of the valve member is effectively drawn out to a discharge-opening side by a Venturi effect generated by the fluid blown out through the main flow channel. Thereby, a fluid having an amount in which the fluid located in the space on the forward-movement-end side of the valve member is added to the fluid located in the pressurization space can be adequately blown out from the discharge opening with a predetermined flow speed.

One aspect of the present invention is such that the aforementioned backward movement of the valve member is carried out by an attraction force of a magnet.

Also, one aspect of the present invention is such that by a groove formed in the valve member, the pressurization space and the main flow channel are linked to each other at a time of the forward movement.

Also, in order to obtain the aforementioned object, in the present invention, in a second aspect, a spray device for the fluid relative to a vehicle camera or a censor comprises the fluid discharge mechanism so that the fluid discharged from the discharge opening is sprayed to an input portion of the vehicle camera or the sensor.

Effect of the Invention

According to the present invention, the fluid located in the space on the forward-movement-end side of the valve member can be sent to the main-flow-channel side through the sub-flow channel so as to reasonably improve the fluid discharge mechanism and a function of the spray device for the fluid relative to the vehicle camera or the sensor formed by including the fluid discharge mechanism.

BEST MODES OF CARRYING OUT THE INVENTION

Figure 1:
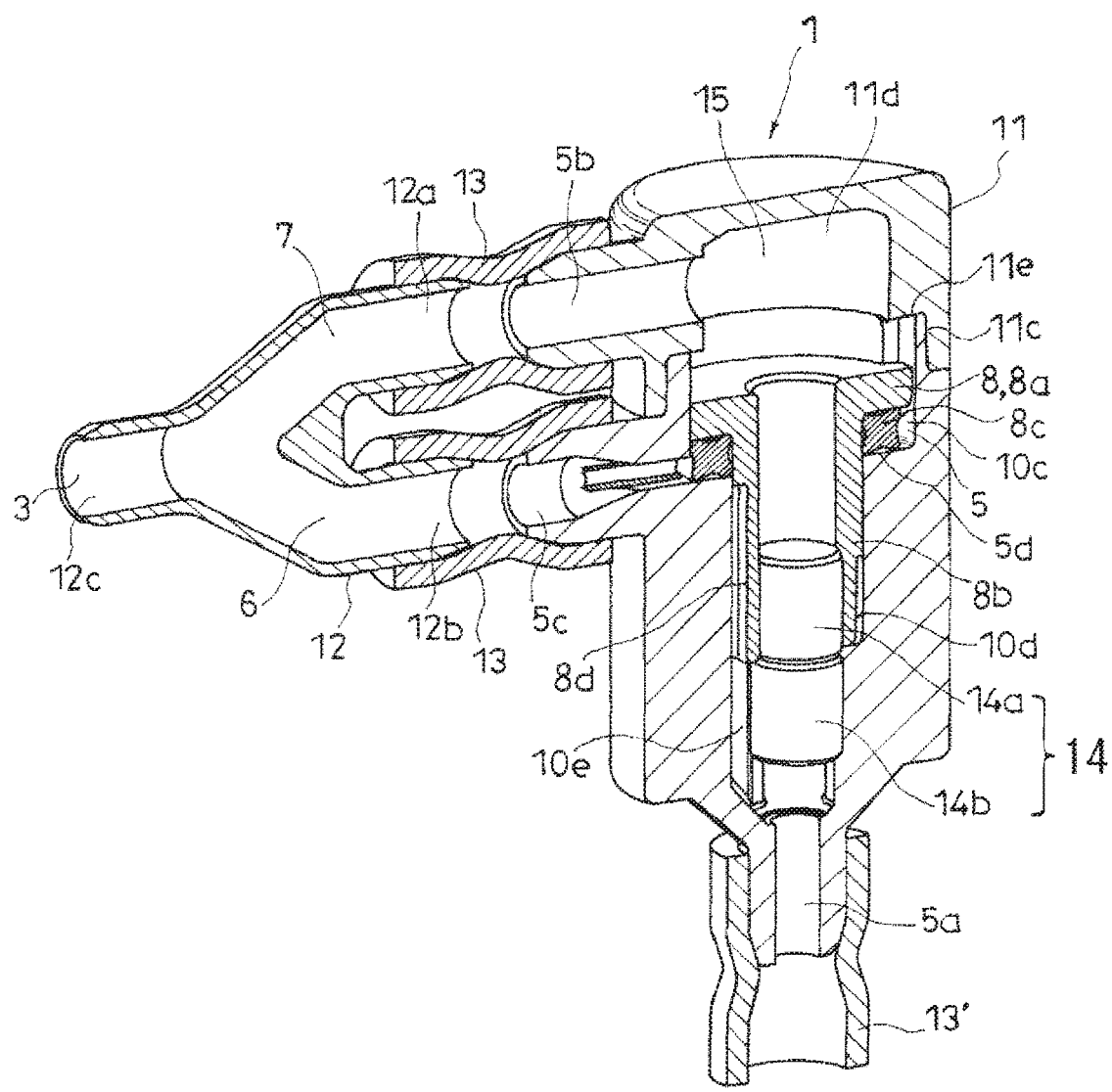
FIG. 1 is a cross-sectional structural view of a fluid discharge mechanism according to one embodiment of the present invention, wherein a valve member is in a valve closing position.

Hereinafter, based on FIG. 1 to FIG. 6, a typical embodiment of the present invention will be explained.

A fluid discharge mechanism 1 according to the embodiment is used for intermittently discharging a fluid such as air and the like from a discharge opening 3.

Also, a spray device 2 for the fluid according to the embodiment is formed by including the fluid discharge mechanism 1 (see FIG. 5 and FIG. 6), and is formed in a vehicle such as a passenger car and the like in such a way so as to spray the fluid discharged from the discharge opening 3 to an input portion of a vehicle camera or a sensor, thereby removing water drops, dust, and the like attached to the input portion by such a fluid.

Typically, such a spray device for the fluid is used together with the vehicle camera or the sensor (the vehicle camera forming an electron mirror monitoring the back of an automobile and the like in place of a conventional door mirror and the like/omitted in the drawings) positioning the input portion such as a light entrance portion and the like outside a vehicle interior of the automobile.

Otherwise, such a spray device for the fluid is provided in a position separated from the vehicle camera or the sensor, the input portion of which is positioned outside the vehicle interior of the automobile, and is used such that the fluid discharged from the discharge opening 3 is sprayed to the input portion through a flow channel extending between the discharge opening 3 and the vicinity of the input portion.

The fluid discharge mechanism 1 according to the embodiment comprises:

(1) a valve chamber 5 including a linking portion 5a linked to a pressurization space 4 for the fluid, a first communication portion 5b formed on a side opposite to the linking portion 5a, and a second communication portion 5c formed in a location between the linking portion 5a and the first communication portion 5b;

(2) a main flow channel 6 communicating the second communication portion 5c with the discharge opening 3;

(3) a sub-flow channel 7 communicating the first communication portion 5b with the main flow channel 6; and (4) a valve member 8 located inside the valve chamber 5, and formed so as to move forward to a first-communication-portion 5b side when a pressurization-space 4 side reaches a predetermined pressure, and open the second communication portion 5c, thereby performing the discharge, and so as to move backward to a linking-portion 5a side after completion of the discharge and close the second communication portion 5c.

Figure 4:
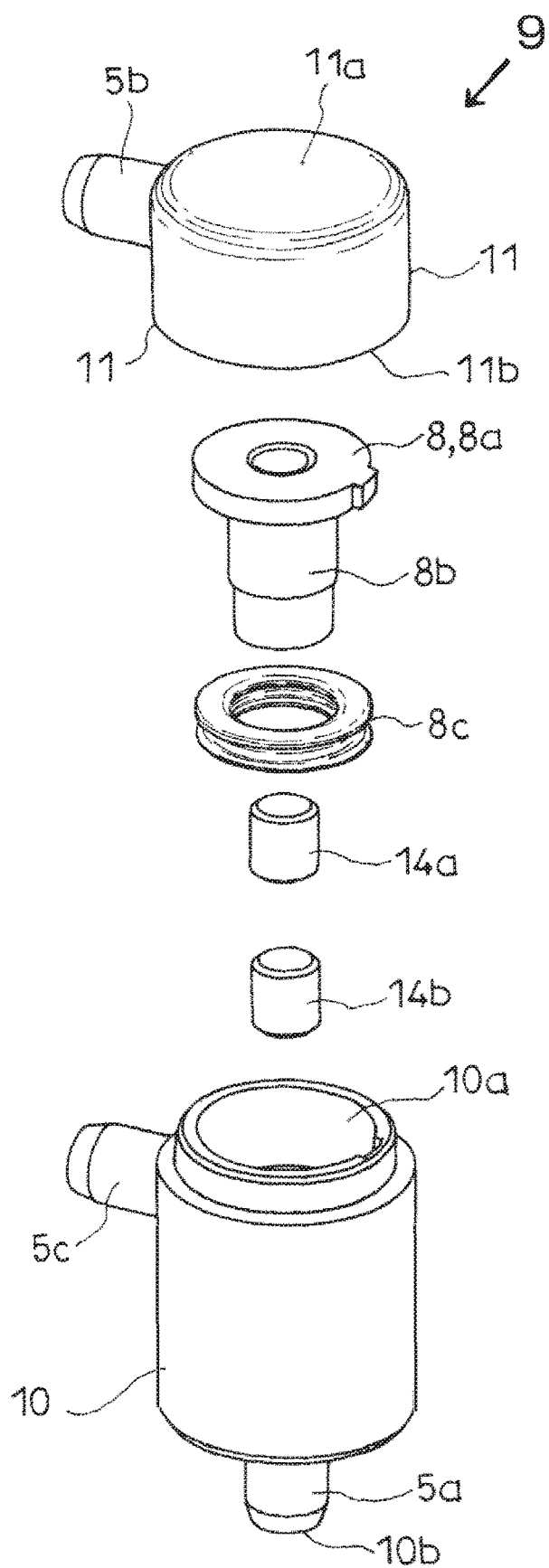
FIG. 4 is an exploded perspective view of respective parts forming the fluid discharge mechanism.

In an illustrated example, the valve chamber 5 is formed by a valve-chamber structural member 9 combined by a main member portion 10 and a cap 11 (see FIG. 4).

The main member portion 10 has a substantially cylindrical shape, and is formed such that one cylinder end 10a thereof is closed by the cap 11, and the other cylinder end 10b thereof is the linking portion 5a.

Figure 2:
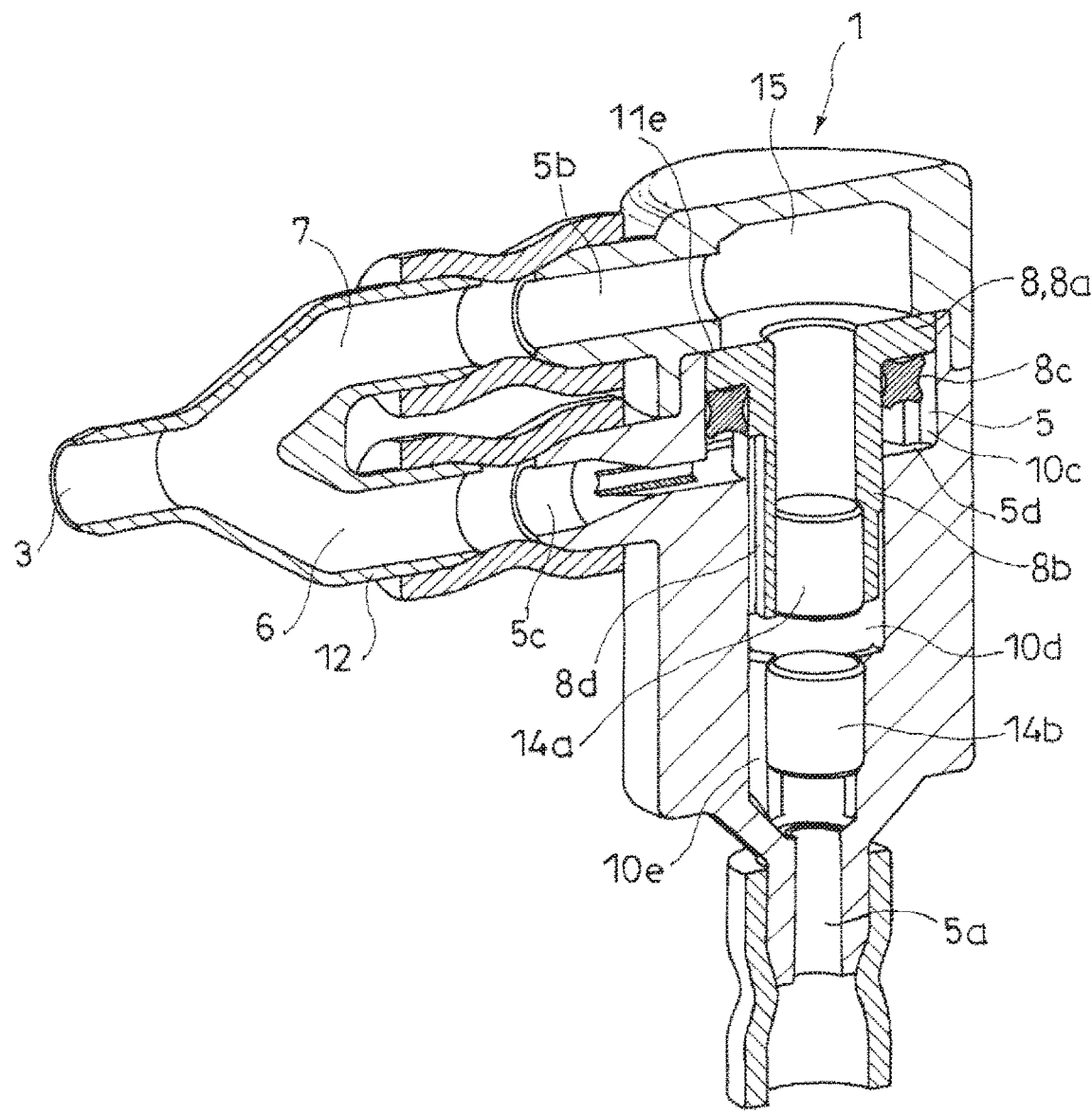
FIG. 2 is a cross-sectional structural view of the fluid discharge mechanism, wherein the valve member is in a valve opening position.
Figure 3:
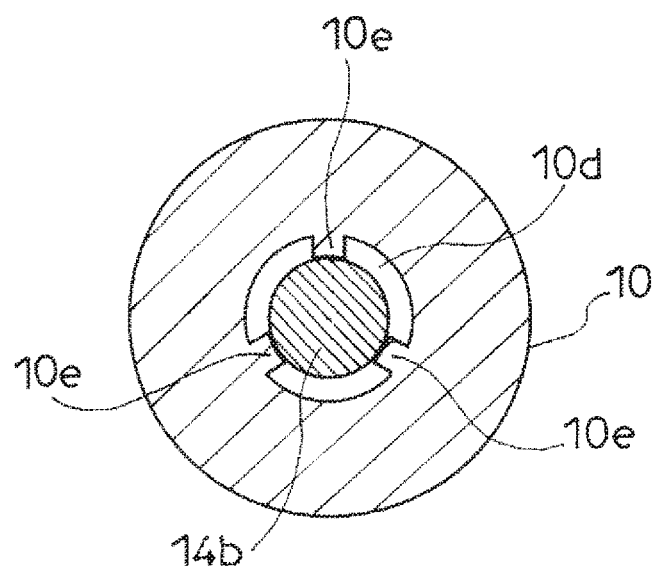
FIG. 3 is a cross-sectional structural view of a small diameter chamber of a main member portion forming a valve chamber of the fluid discharge mechanism.

The one-cylinder-end 10a side of the main member portion 10 becomes a large diameter chamber 10c (see FIG. 1 and FIG. 2). A small diameter chamber 10d is located between the large diameter chamber 10c and the linking portion 5a.

In a side portion of the large diameter chamber 10c, there is linked a tube portion extending in a direction orthogonal to a cylinder shaft of the main member portion 10, and the tube portion functions as the second communication portion 5c.

A valve seat 5d relative to the valve member 8 becomes a step face inside the main member portion 10 formed by a size difference between the large diameter chamber 10c and the small diameter chamber 10d, and surrounds an opening facing the large diameter chamber 10c and connecting the large diameter chamber 10c and the small diameter chamber 10d.

The cap 11 has a substantially cylindrical shape, closes one cylinder end 11a thereof, and opens the other cylinder end 11b thereof.

The other-cylinder-end 11b side of the cap 11 becomes an enlarged diameter portion 11c in which an inner diameter is enlarged, and a reduced diameter portion 11d, in which the inner diameter is made smaller than that of the enlarged diameter portion 11c, is located between the enlarged diameter portion 11c and the closed one cylinder end 11a (see FIG. 1). Thereby, the cap 11 comprises a circumferential step portion 11e facing the other-cylinder-end 11b side inside the cap 11.

In a portion which is a side portion of the cap 11, and is located between one cylinder end 11a and the circumferential step portion 11e, there is linked the tube portion extending in the direction orthogonal to the cylinder shaft of the cap 11, and the tube portion functions as the first communication portion 5b.

The cap 11 is combined relative to the main member portion 10 by fitting the one-cylinder-end 10a side of the main member portion 10 into an inside of the enlarged diameter portion 11c until the one cylinder end 10a of the main member portion 10 abuts against the circumferential step portion 11e.

In the illustrated example, there is connected a branched tube 12 having a Y shape relative to the valve-chamber structural member 9 formed as described above. One terminal 12a on a branched side of the branched tube 12 is connected to the tube portion which becomes the first communication portion 5b through a connecting tube shown by the reference 13 in the drawings, and the other terminal 12b on the branched side of the branched tube 12 is connected to the tube portion which becomes the second communication portion 5c through the connection tube 13. Then, a terminal 12c on a non-branched side of such a branched tube 12 functions as the discharge opening 3, and the main flow channel 6 and the sub-flow channel 7 are formed by such a branched tube 12.

The valve member 8 includes a valve head portion 8a having a disk shape, and a cylindrical shaft portion 8b projecting from a center on one face side of the valve head portion 8a (see FIG. 4). An outer diameter of the valve head portion 8a has a size which can be housed in the large diameter chamber 10c, but cannot enter the small diameter chamber 10d. The valve member 8 is held inside the valve chamber 5 in such a way so as to be movable in a direction along the cylinder shaft of the main member portion 10 in a state wherein the valve head portion 8a is positioned inside the large diameter chamber 10c, and the shaft portion 8b is inserted into the small diameter chamber 10d.

In the illustrated example, also, a seal ring 8c forming one portion of the valve head portion 8a fits in a base portion of the shaft portion 8b so as to contact the valve seat 5d with the seal ring 8c.

Also, in the illustrated example, in a valve closing position wherein the valve head portion 8a of the valve member 8 sits in the valve seat 5d, the second communication portion 5c is closed by the seal ring 8c (see FIG. 1).

Also, the valve member 8 in the valve closing position can move forward to a valve opening position wherein the other face side of the valve head portion 8a abuts against the circumferential step portion 11e of the cap 11, and in the valve opening position, the valve head portion 8a separates from the valve seat 5d, and the second communication portion 5c is open (see FIG. 2).

Also, the outer diameter of the shaft portion 8b of the valve member 8 and a diameter of the small diameter chamber 10d are substantially equal, and in a side portion of the shaft portion 8b, there is formed a strip of groove 8d (a groove in one portion) through an entire length thereof along a length direction of the shaft portion 8b (see FIG. 1 and FIG. 2).

In the embodiment, in a state wherein the valve member 8 is in the valve opening position, the pressurization space 4 and the main flow channel 6 are connected through the strip of groove 8d.

Also, in the embodiment, until a pressure in the pressurization space 4 reaches the predetermined pressure by an advancement of the later-described piston 16, the valve member 8 is held by a holding device 14 in the valve closing position allowing the valve head portion 8a to tightly contact the valve seat 5d (see FIG. 1).

When the pressure in the pressurization space 4 reaches the predetermined pressure, the holding by the holding device 14 is released, the valve member 8 moves to the valve opening position, and a compressed fluid is blown out from the discharge opening 3 through the main flow channel 6.

In such a valve opening state, a passing portion of the fluid in the small diameter chamber 10d is substantially limited to the strip of groove 8d formed in the shaft portion 8b of the valve member 8, so that a flow speed of the discharged fluid can be effectively increased.

In the embodiment, the holding device 14 comprises either a magnet or a ferromagnetic material to which the magnet is attracted on a valve-member 8 side, and the other of the magnet or the ferromagnetic material on a valve-chamber 5 side.

In the illustrated example, a first columnar member 14a fits into the shaft portion 8b of the valve member 8 such that an end face of the first columnar member 14a becomes a same face as a tip of the shaft portion 8b (see FIG. 1 and FIG. 2).

Also, a second columnar member 14b fits into the small diameter chamber 10d of the valve chamber 5. In the illustrated example, inside the small diameter chamber 10d, there are formed three ribs 10e continuing in the direction along the cylinder shaft of the main member portion 10 such that the flow channel for the fluid is located between adjacent ribs 10e in a direction surrounding the cylinder shaft (see FIG. 3). The second columnar member 14b fits into the small diameter chamber 10d among tips of the three ribs 10e. An end face of the second columnar member 14b is positioned in a portion where the tip of the shaft portion 8b of the valve member 8 is positioned in the valve closing position.

Thereby, in the embodiment, until reaching the predetermined pressure on the pressurization-space 4 side by the advancement of the later-described piston 16, the valve member 8 is held by the holding device 14 in the valve closing position allowing the valve head portion 8a to tightly contact the valve seat 5d, and at a moment the pressure on the pressurization-space 4 side exceeds a predetermined value, the valve member 8 moves to the valve opening position so as to blow the fluid inside the pressurization space 4 out from the discharge opening 3 with a predetermined flow speed. Also, when a first fluid blowing-out ends, the valve member 8 can move to the closing valve position immediately by an attraction force of the magnet. Namely, in the embodiment, the backward movement of the valve member 8 is performed by the attraction force of the magnet.

Also, in the embodiment, a space 15 on a forward-movement-end side of the valve member 8 communicates with the main flow channel 6 through the sub-flow channel 7, so that when the valve member 8 moves forward, i.e. moves from the valve closing position to the valve opening position, fluid located in the space 15 on the forward-movement-end side of the valve member 8 can be sent out to a main-flow-channel 6 side, and a forward movement of such a valve member 8 can be smoothly performed. Especially, the fluid located in the space 15 on the forward-movement-end side of the valve member 8 is effectively pulled out to a discharge-opening 3 side by a Venturi effect generated by the fluid blown out through the main flow channel 6. Thereby, a fluid having an amount in which the fluid located in the space 15 on the forward-movement-end side of the valve member 8 is added to the fluid located in the pressurization space 4 can be adequately blown out from the discharge opening 3 with the predetermined flow speed.

One example of the spray device for the fluid formed by including the fluid discharge mechanism 1 explained above is shown in FIG. 5 and FIG. 6.

The spray device 2 for the fluid comprises:
(1) the discharge opening 3 for the fluid;
(2) a cylinder 17 connecting the pressurization space 4 in front of the piston 16 (a space inside the cylinder 17 changes a volume by a movement of the piston 16) to the linking portion 5a of the fluid discharge mechanism 1;
(3) a drive mechanism 18 of the piston 16 including a motor 18a; and
(4) the fluid discharge mechanism 1 located inside a flow channel 19 communicating the pressurization space 4 with the discharge opening 3 and functioning in such a way so as to open the valve when the pressure in the pressurization space 4 reaches the predetermined value by the advancement of the piston 16, and to open the flow channel 19.

In the illustrated example, the spray device 2 for the fluid has a structure of directly or indirectly spraying the fluid such as an air and the like on the light entrance portion of the vehicle camera or the sensor from the discharge opening 3. The fluid can be a cleaning solution, or a liquid wherein the air is mixed with the cleaning solution as well.

In the illustrated example, the spray device 2 for the fluid is formed such that the aforementioned elements (1) to (4) are embedded in a flat casing 20 which is long in a front-back direction x, is short in a right-and-left direction y, and has a thickness in an up-and-down direction z.

Also, in the illustrated example, the casing 20 of the spray device 2 for the fluid is formed by combining a lower portion 20a and an upper portion (not shown in the drawings) which are separable at an approximately middle position in the thickness direction thereof.

The piston 16 moves along the front-back direction x. The pressurization space 4 in front of the piston 16 is linked to the linking portion 5a forming the fluid discharge mechanism 1 through a fore flow channel 19a forming one portion of the flow channel 19. The reference 13' in the drawings represents the connecting tube communicating the other cylinder end 10b of the main member portion 10, which becomes the linking portion 5a, with the fore flow channel 19a.

The drive mechanism 18 of the piston 16 comprises an urging device 18b urging the piston 16 in a retreat direction; and a rotating member 18c comprising a cam portion 18d against which a back end portion 16a of the piston 16 abuts by the urging, and rotation-driven by the motor 18a. Then, at a time of a rotation of the rotating member 18c, the piston 16 moves back and forth by a shape of the cam portion 18d.

In the illustrated example, a gear 18f engaging a worm 18e integrated with an output shaft of the motor 18a and a gear 18h engaging a gear portion 18g formed on an outer periphery of the rotating member 18c are engaged with each other so as to rotate the rotating member 18c by the driving of the motor 18a.

On one face of the rotating member 18c, there is formed the cam portion 18d. The cam portion 18d has a structure of protruding from a lower face of the rotating member 18c, and forms a cam face 18i as a circumferential step face between the cam portion 18d and the lower face of the rotating member 18c. The cam face 18i includes a first portion 18j which maximizes a distance between the first portion 18j and a rotation shaft 18m of the rotating member 18c; and a second portion 18k positioned on a side opposite to the first portion 18j by sandwiching the rotation shaft 18m of the rotating member 18c.

In the illustrated example, the urging device 18b is a compression coil spring. Naturally, such an urging device 18b is sufficient if the urging device can urge the piston 16 in the retreat direction, and there can be used an elastic member which exerts a repulsive force similar to various types of springs other than the compression coil spring or a spring. One end of the spring presses against a step 17a formed in a portion surrounding an opening opposite to the pressurization-space 4 side of the cylinder 17, and the other end of the spring presses against a flange portion 16c formed between a front end portion 16b and the back end portion 16a of the piston 16.

In the illustrated example, the back end portion 16a of the piston 16 has a plate shape, enters below one face of the rotating member 18c, and constantly presses against the cam face 18i of the cam portion 18d by urging of the urging device 18b.

Figure 5:
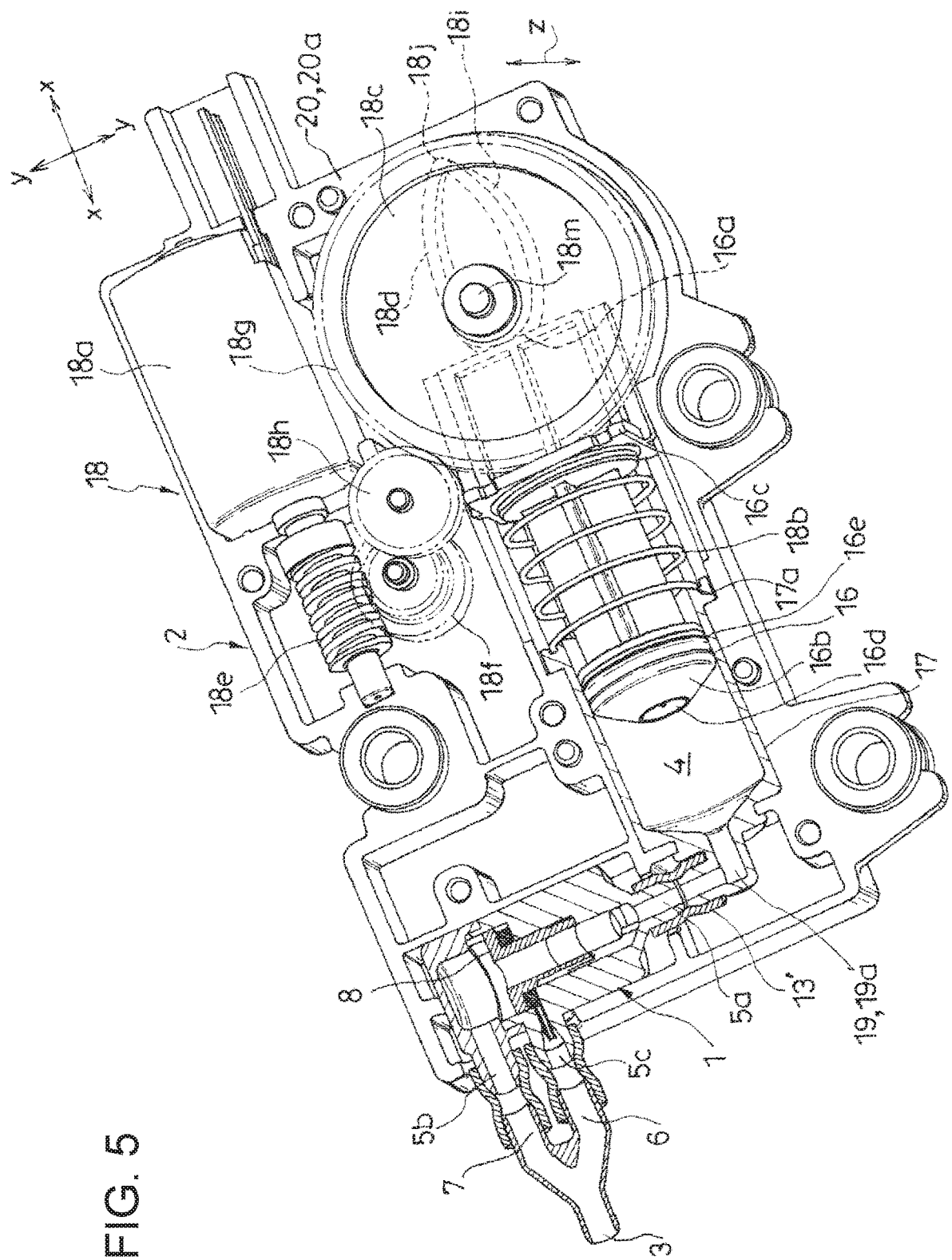
FIG. 5 is a broken internal structural view of essential parts of a spray device for a fluid formed by including the fluid discharge mechanism, wherein the valve member is in the valve closing position.
Figure 6:
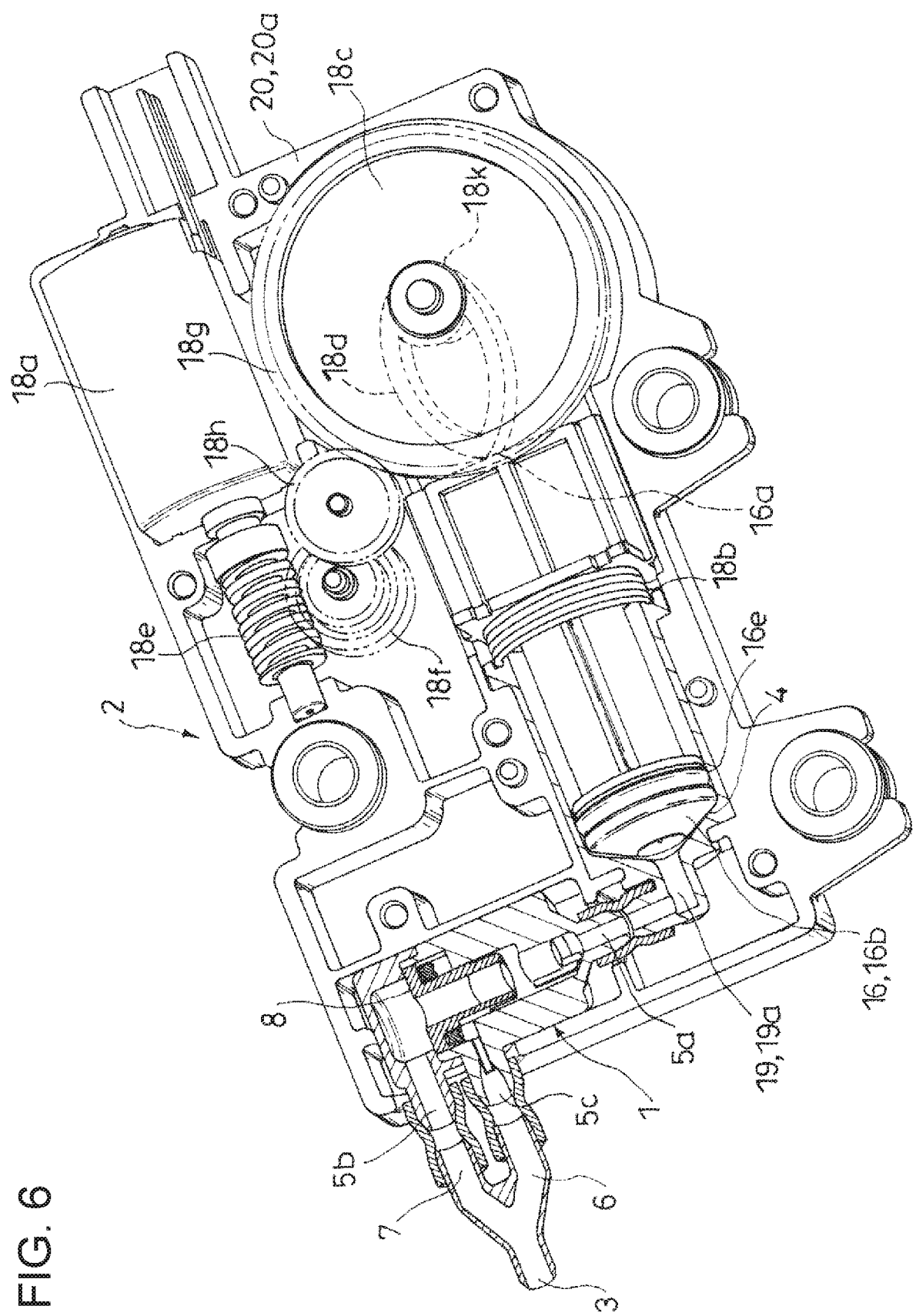
FIG. 6 is a broken internal structural view of the essential parts of the spray device for the fluid formed by including the fluid discharge mechanism, wherein the valve member is in the valve opening position.

When the rotating member 18c is located in a rotational position pressing the second portion 18k of the cam face 18i against the back end portion 16a of the piston 16, the piston comes to a most retreated position by urging of the compression coil spring (FIG. 5). On the other hand, when the rotating member 18c is located in a rotational position pressing the first portion 18j of the cam face 18i against the back end portion 16a of the piston 16, the piston 16 comes to a most advanced position, so that the compression coil spring comes to a most compressed state (FIG. 6).

In the illustrated example, when the piston 16 advances, the seal ring 16e is elastically widened by a fluid entering into an inside of a seal ring 16e sealing between a side portion of the piston 16 and an inner wall of the cylinder through a ventilation hole 16d formed in a center of the front end portion facing the pressurization space 4 in the piston 16 so as to enhance a sealing property. On the other hand, when the piston 16 retreats, the sealing property disappears, so that the fluid is drawn into the pressurization space 4 from a back side of the piston 16 from an outside.

Incidentally, naturally, the present invention is not limited to the embodiment explained hereinabove, and includes all embodiments which can obtain the object of the present invention.

EXPLANATION OF SYMBOLS 3 a discharge opening
4 a pressurization space
5 a valve chamber
5a a linking portion
5b a first communication portion
5c a second communication portion
6 a main flow channel
7 a sub-flow channel
8 a valve member Incidentally, all contents of the specification, claims, drawings, and abstract of Japanese Patent Application No. 2017-197755 filed on Oct. 11, 2017 are cited in their entireties herein and are incorporated as a disclosure of the specification of the present invention.

What is claimed is:

1. A fluid discharge mechanism for intermittently discharging a fluid from a discharge opening, comprising:
    a valve chamber including a linking portion linked to a pressurization space for the fluid, a first communication portion formed on a side opposite to the linking portion, and a second communication portion formed at a location between the linking portion and the first communication portion;
    a main flow channel communicating the second communication portion with the discharge opening;
    a sub-flow channel communicating the first communication portion with the main flow channel; and
    a valve member located inside the valve chamber and configured to move forward to a first-communication-portion side when a pressurization-space side reaches a predetermined pressure, to open the second communication portion, thereby performing a discharge, and to move backward to a communication-portion side after completion of the discharge.

2. A fluid discharge mechanism according to claim 1, wherein a backward movement of the valve member is performed by an attraction force of a magnet.

3. A fluid discharge mechanism according to claim 1, wherein at a time of a forward movement of the valve member, the pressurization space and the main flow channel communicate with each other by a groove formed in the valve member.

4. A spray device for a fluid relative to a vehicle camera or a censor, comprising:
    the fluid discharge mechanism according to claim 1 such that a fluid discharged from the discharge opening is sprayed to an input portion of the vehicle camera or the sensor.

* * * * *